United States Patent

Higashino

[11] Patent Number: 6,062,101
[45] Date of Patent: May 16, 2000

[54] COLUMN MOUNTING ASSEMBLY FOR TILT-TYPE STEERING DEVICE

[75] Inventor: Kiyoharu Higashino, Gunma-machi, Japan

[73] Assignee: NSK Ltd., Tokyo, Japan

[21] Appl. No.: 09/014,600

[22] Filed: Jan. 28, 1998

Related U.S. Application Data

[63] Continuation-in-part of application No. 08/753,015, Nov. 19, 1996, abandoned.

[30] Foreign Application Priority Data

Nov. 29, 1995 [JP] Japan .................................. 7-310262

[51] Int. Cl.$^7$ ...................................................... B62D 1/18
[52] U.S. Cl. .................................................................. 74/493
[58] Field of Search ................................................ 74/493

[56] References Cited

U.S. PATENT DOCUMENTS 4,041,796  8/1977  Shishido ................................. 74/493

FOREIGN PATENT DOCUMENTS 2087808  6/1982  United Kingdom .

Primary Examiner—Thomas R. Hannon
Assistant Examiner—Colby Hansen
Attorney, Agent, or Firm—Vorys, Sater, Seymour and Pease LLP

[57] ABSTRACT

A column mounting assembly for a tilt-type steering device comprises a supporting bracket with a pair of vertical plate portions to be secured to an automobile body, tilt adjusting bolt integrated with a steering column disposed between the vertical plate portions, and held by the vertical plate portions raisably and lowerably, an operation lever rotatably operable between a first angle position and a second angle position, and tilt adjusting for fastening the tilt adjusting bolt to the bracket when the operation lever is located in the first angle position, and unfastening the tilt adjusting bolt to make the tilt adjusting bolt raisable and lowerable when the operation lever is located in the second angle position. A serration engagement section is provided between the operation lever and adjusting nut to transmit rotation of the operation lever to the adjusting nut.

4 Claims, 4 Drawing Sheets

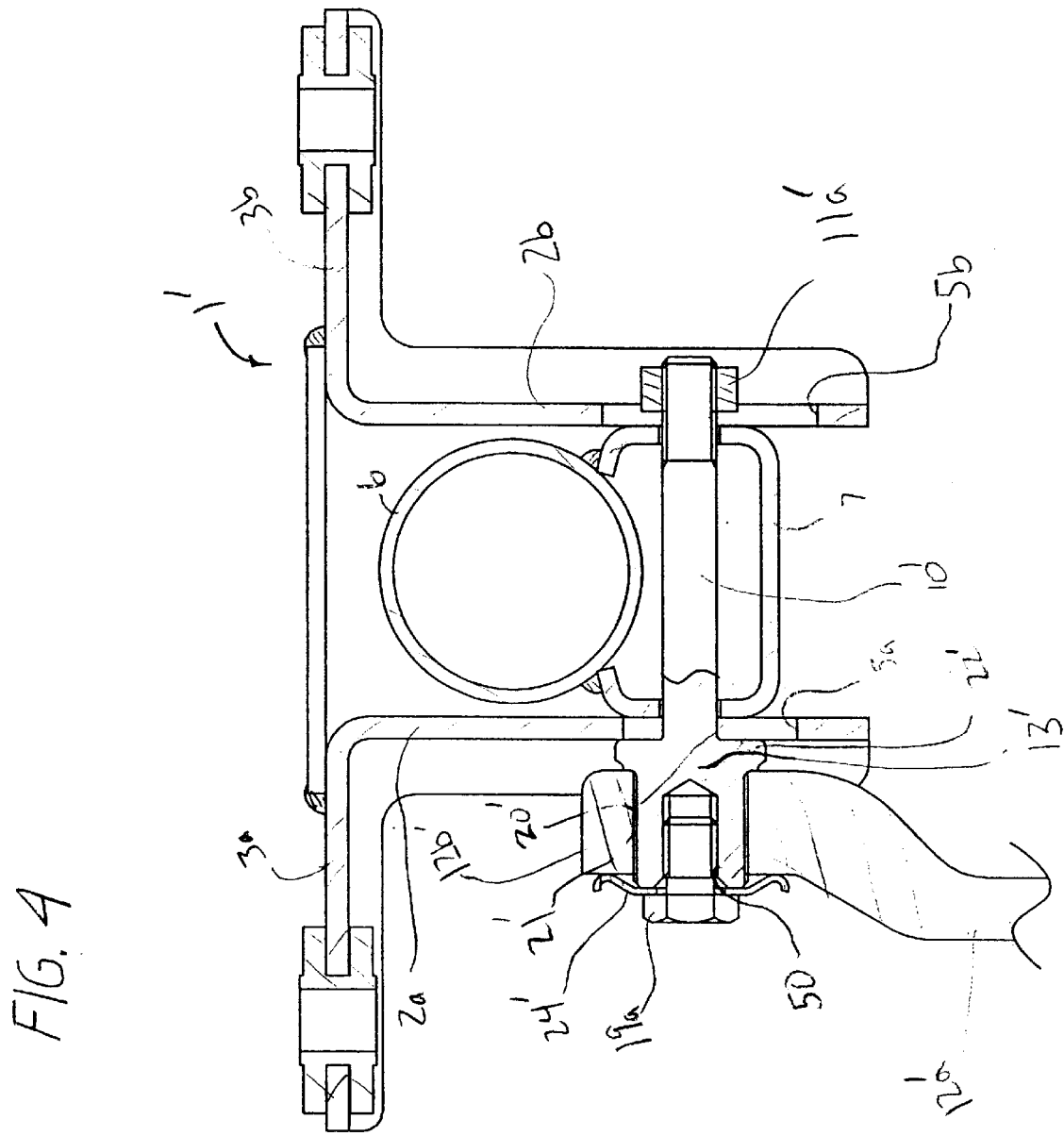

COLUMN MOUNTING ASSEMBLY FOR TILT-TYPE STEERING DEVICE

This application is a continuation-in-part of U.S. application Ser. No. 08/753,015 filed Nov. 19, 1996 now abandoned.

BACKGROUND OF THE INVENTION

1. Field of the Invention

The present invention relates to a tilt-type steering device and more particularly to a column mounting assembly for a tilt-type steering device capable of adjusting the height position of a steering wheel to a driver's physique and posture during driving.

2. Related Background Art

A tilt-type steering device can adjust the height of a steering wheel freely by supporting a portion of a steering column raisably and lowerably relative to an automobile body. The intermediate portion of the steering column constituting such a tilt-type steering device is supported by the body via, e.g., a structure as shown in FIGS. 2 and 3 in a lower surface portion of a dashboard or the like. A supporting bracket 1 constituting this supporting device is made of one piece by subjecting a steel plate with sufficient rigidity to press working, and has a pair of lateral vertical plate portions 2a, 2b provided so as to have a certain distance between them and mounting plate portions 3a, 3b formed on the upper portions of the vertical plate portions 2a, 2b. In FIGS. 2 and 3 lower edges of the vertical plate portions 2a, 2b are connected by a connecting plate portion 4. Also, holes 5a, 5b are formed in respectively opposite positions of the vertical plate portions 2a, 2b so as to be elongated in the vertical direction.

Also, a raising and lowering bracket 7 is secured to the lower surface of the intermediate portion of the cylindrical steering column 6 between the pair of the vertical plate portions 2a, 2b by means of welding. The raising and lowering bracket 7 is formed with a pair of lateral round holes 9a, 9b in opposition to the respective elongated holes 5a, 5b. A steering shaft 8 to be rotated by a steering wheel (not shown) is supported only rotatably inside the steering column 6.

A tilt adjusting bolt 10 is inserted in the elongated holes 5a, 5b and the round holes 9a, 9b. A tilt adjusting nut 11 is engaged with a male screw portion of an end portion of the bolt 10 projecting from the outer side surface of the vertical plate portion 2a (on the left in FIG. 3). Further, on the nut 11 is secured a base end portion of a tilt adjusting operation lever 12. A head 13 of the tilt adjusting bolt 10 and both side edges of the right-hand elongated hole 5b are engaged with each other so as to prevent rotation of the head 13, thereby constituting rotation preventing means for preventing rotation of the tilt adjusting bolt 10. Therefore, the head 13 is provided with flat faces 13a for contact with both side edges of the elongated hole 5b. Accordingly, when the operation lever 12 is operated, the distance between the head 13 and the tilt adjusting nut 11 can be adjusted.

For example, first, the operation lever 12 is rotated clockwise in FIG. 2, i.e., up to the position as indicated in phantom to enlarge the distance between the head 13 and the nut 11. Then, in this condition, when the bolt 10 is shifted along the elongated holes 5a, 5b to raise or lower the steering column 6, the height position of the steering wheel can be adjusted. On the other hand, when the operation lever 12 is rotated up to the position as indicated by the solid line of FIG. 2 thereby to shorten the above-mentioned distance, the raising and lowering of the steering column 6 is prevented and the height position of the steering wheel can be set to the position after the adjustment.

Under a portion of the rear end portion (right end portion in FIG. 2) of the steering column 6 projecting further rearward (rightward in FIG. 2) beyond the supporting bracket 1, a knee protecting plate 14 is secured, whereby driver's knees are prevented from colliding with square portions such as corners of the supporting bracket 1, etc. at the time of a collision accident. A crank-like bent portion 15 is provided in the intermediate portion of the operation lever 12 to avoid interference with the knee protecting plate 14. Also, the base end portion of the operation lever 12 is provided with a claw 16 for limiting the amount of rotation of the lever 12. The rotation range of the operation lever 12 is limited between the solid-line condition and the two-dot chain line condition by the abutting between the claw 16 and the rear end edge (right end edge of FIG. 2) of the vertical plate portion 2a.

Although the amount of rotation of the operation lever 12 is limited in accordance with the abutting between the claw 16 and the vertical plate portion 2a, the tilt-type steering device is assembled in the following manner such that the fastening and unfastening of the steering column 6 can be performed within the limited rotation range. First, the raising and lowering bracket 7 secured to the steering column 6 is inserted between the vertical plate portions 2a, 2b of the supporting bracket 1, and the tilt adjusting bolt 10 is passed through the elongated holes 5a, 5b of the respective vertical plate portions 2a, 2b and the round holes 9a, 9b of the raising and lowering bracket 7. Then, the head 13 of the bolt 10 is engaged with one elongated hole 5b (on the right side in FIG. 3), and the tilt adjusting nut 11 is engaged with the male screw portion provided on an end portion of the bolt 10. As the peripheral surface of the base portion (on the right side in FIG. 3) of the nut 11 is provided with a pair of flat faces in parallel with each other, the nut 11 is rotated by engaging a tool such as a spanner with the flat faces to shorten the distance between the nut 11 and the head 13, whereby the raising and lowering bracket 7 is secured to the supporting bracket 1.

After the raising and lowering bracket 7 is secured to the supporting bracket 1, a tapered tube portion 18 formed in the base end portion of the operation lever 12 is fitted on a tapered portion 17 formed on a half portion (left half portion in FIG. 3) of the nut 11. Then, the lever 12 is rotated to be in the solid line condition of FIG. 2. Next, a fixing screw 19 is fastened to the nut 11 via a washer 21 to secure the operation lever 12 and the nut 11. As a result, when the operation lever 12 is rotated until the claw 16 abuts onto the rear end edge of the vertical plate portion 2a, the raising and lowering bracket 7 is secured to the supporting bracket 1.

Although a drawing is omitted, there is a well-known structure in which a tilt adjusting nut is engaged with an elongated hole only raisably (not rotatably) and a tilt adjusting bolt is made rotatable.

In such a structure, the base end portion of a tilt adjusting operation lever is secured to the head of the bolt. Therefore, the head of the bolt is provided with a tapered portion and a screw hole for engagement with a fixing screw.

In the above-structured conventional tilt-type steering device, the material usable for the operation lever 12 is limited and it is difficult to form it lightly and cheaply. That is, in order to secure the operation lever 12 firmly to the tilt adjusting nut 11 (so as not to cause relative rotation), it is necessary to fasten the fixing screw 19 with a sufficiently large torque. As a result, a large amount of stress is applied to the tapered tube portion 18 formed in the base end portion of the operation lever 12. Therefore, the material for the operation lever 12 is necessitated not to be damaged by such stress and is steel conventionally. For forming the operation lever 12 lightly and cheaply, it is considered to utilize synthetic resin, aluminum alloy or the like. However, in the conventional structure shown in FIGS. 2 and 3, it is difficult to adopt these materials.

Also, there is considerable difference in temperature inside the automobile provided with the tilt adjusting nut 11 and the operation lever 12 between summer and winter. If the operation lever 12 is made of synthetic resin or aluminum alloy according to the conventional structure shown in FIGS. 2 and 3, there is a possibility that the contact pressure between the outer peripheral surface of the tapered portion 17 and the inner peripheral surface of the tapered tube portion 18 is changed beyond a permissible value due to the difference in thermal expansion between the steel adjusting nut 11 and the operation lever 12 based on the temperature difference. Then, if the contact pressure becomes excessively large, the tapered tube portion 18 may be damaged. On the other hand, if it becomes excessively small, the adjusting nut 11 cannot be rotated by the operation lever 12.

In Japanese Utility Model Publication No. 62-18121, another structure is described wherein an adjusting nut is linked to a base end portion of an operation lever by serration engagement. In the structure of this publication, there occurs no inadequate rotation of the adjusting nut by means of the operation lever depending on the temperature change. However, in the structure, the base end portion of the operation lever is also held tightly with a washer and the adjusting nut, so that a large amount of stress is added to the base end portion of the operation lever (particularly at the time of temperature rise). Therefore, it is difficult to make the operation lever by the use of synthetic resin or aluminum alloy.

SUMMARY OF THE INVENTION

In view of the above circumstances, an adjustable column mounting assembly for a tilt-type steering device of the present invention is made, and it is an object to provide a structure wherein even though an operation lever is made of a material other than steel, this operation lever will not be damaged and no inadequate operation thereof occurs.

As an example of the aforementioned conventional adjustable column mounting assembly, an adjustable column mounting assembly of the present invention has a tilt adjusting bolt being disposed so as to be raisable and lowerable between a pair of vertical plate portions of a supporting bracket to be fixed to an automobile body, and being raised and lowered together with a steering column disposed between the vertical plate portions; and a tilt adjusting nut engaged with a male screw portion formed on an end portion of the tilt adjusting bolt. One member of the tilt adjusting nut and the head of the tilt adjusting bolt is engaged with a vertical plate portion so as not to be made rotatable, and the other member is made rotatable with respect to a vertical plate portion. A base end portion of an operation lever is fixed to the other member. In accordance with rotation of the other member by means of the operation lever, the tilt adjusting bolt is fastened to or unfastened from the supporting bracket.

Particularly, in the column mounting assembly of the tilt-type steering device of the present invention, a serrated hole is formed in the base end portion of the operation lever, and a male serrated portion is formed on at least the intermediate portion of the above other member in its axial direction. Then, with the male serrated portion engaged with the serrated hole, the inner side surface of the base end portion of the operation lever is brought into contact with the outer side surface of an arresting flange formed on a base end portion of the above other member. Further, a base end portion of an elastic member is fixed to the end portion of the above other member, and an end portion of the elastic member urges the outer side surface of the base end portion of the operation lever elastically.

In the above-described column mounting assembly for the tilt-type steering device of the present invention, the operation that the distance between the head of the bolt and the tilt adjusting nut is changed in accordance with the operation of the operation lever to fasten or unfasten the steering column with respect to the supporting bracket is the same as the conventional column mounting assembly for the tilt-type steering device.

Particularly, in the column mounting assembly of the present invention, the transmission of rotational motion between the operation lever and the tilt adjusting nut or the tilt adjusting bolt is performed in accordance with the engagement of the male serrated portion and the serrated hole. Therefore, there is no need to press a portion of the operation lever against the tilt adjusting nut or the head of the tilt adjusting bolt strongly. Accordingly, it is possible to make the operation lever by the use of a material such as synthetic resin or aluminum alloy which is lighter in weight but lower in strength than steel. Also, the base end portion of the operation lever is pressed against the arresting flange of the tilt adjusting nut or the head of the tilt adjusting bolt by the elastic member, so that the engaging portion between the tilt adjusting nut or the tilt adjusting bolt and the operation lever will not be loosened.

BRIEF DESCRIPTION OF THE DRAWINGS

FIG. 4 is a sectional view showing a second embodiment of the present invention.

DETAILED DESCRIPTION OF THE PREFERRED EMBODIMENT

The present invention will be described in detail with reference to the accompanying drawings hereinafter.

Figure 1:
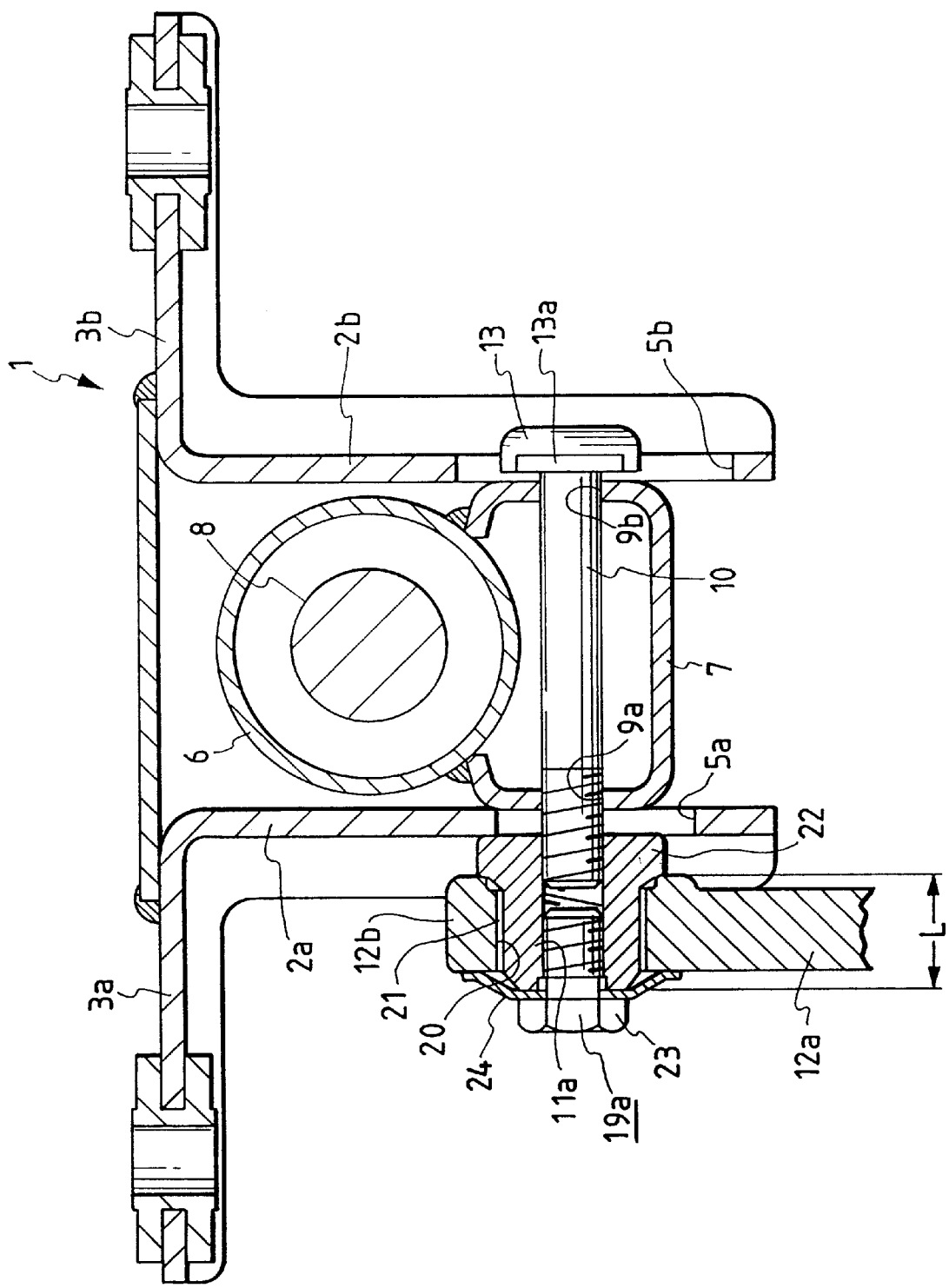
FIG. 1 is a sectional view showing first embodiment of the present invention, corresponding to a sectional view taken along the A—A line of FIG. 2.

FIG. 1 is an embodiment of the present invention. A feature of the present invention is the structure of an engaging portion of an adjusting nut and an operation lever. The structure and operation of the other elements are the same as those of the aforementioned conventional ones. Therefore, the same and like elements are designated by identical reference numbers and the description thereof will be omitted or simplified. Then, a featured portion of the present invention will be described chiefly, below.

Figure 2:
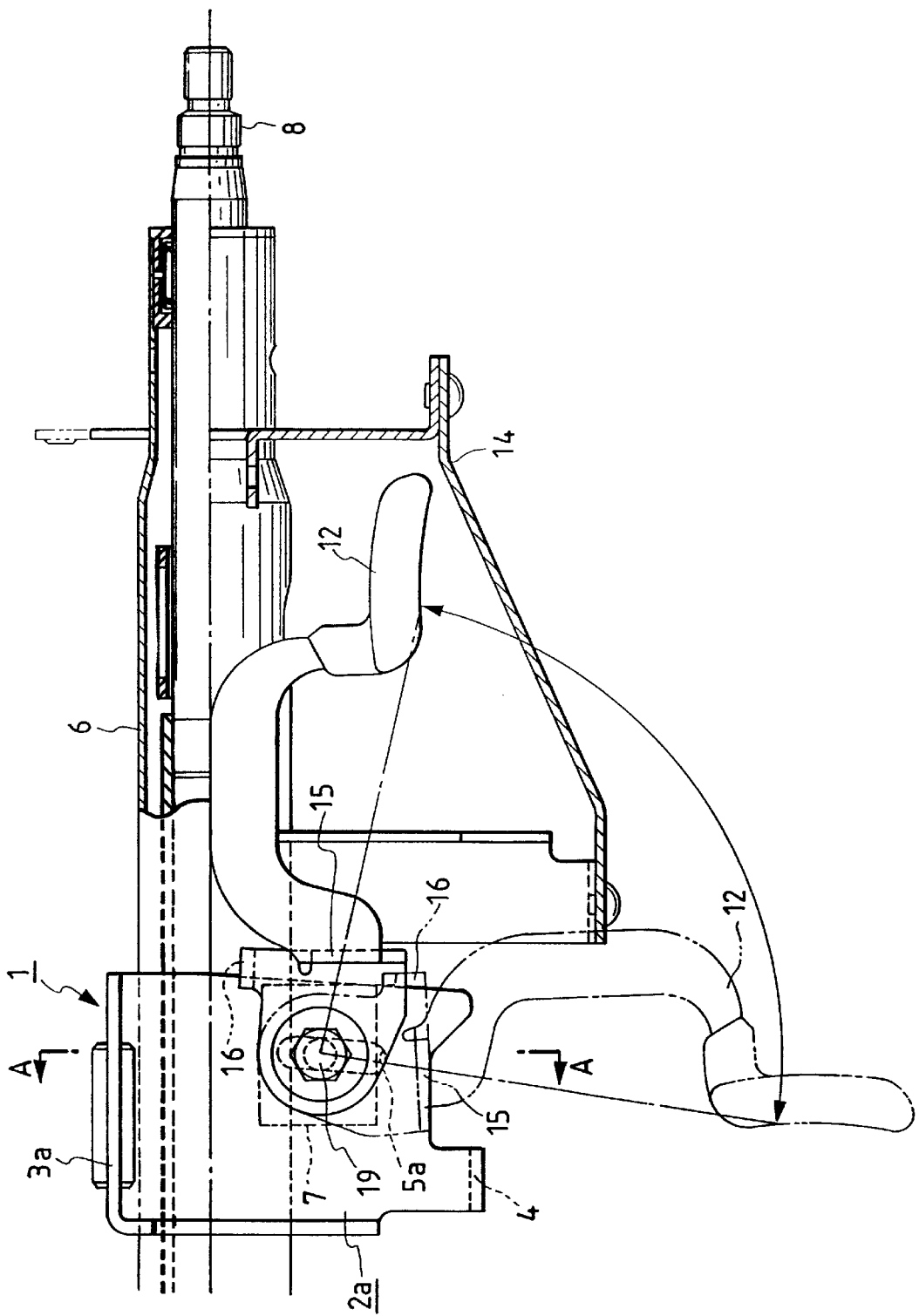
FIG. 2 is a partial vertical sectional side view showing a conventional tilt-type steering device.
Figure 3:
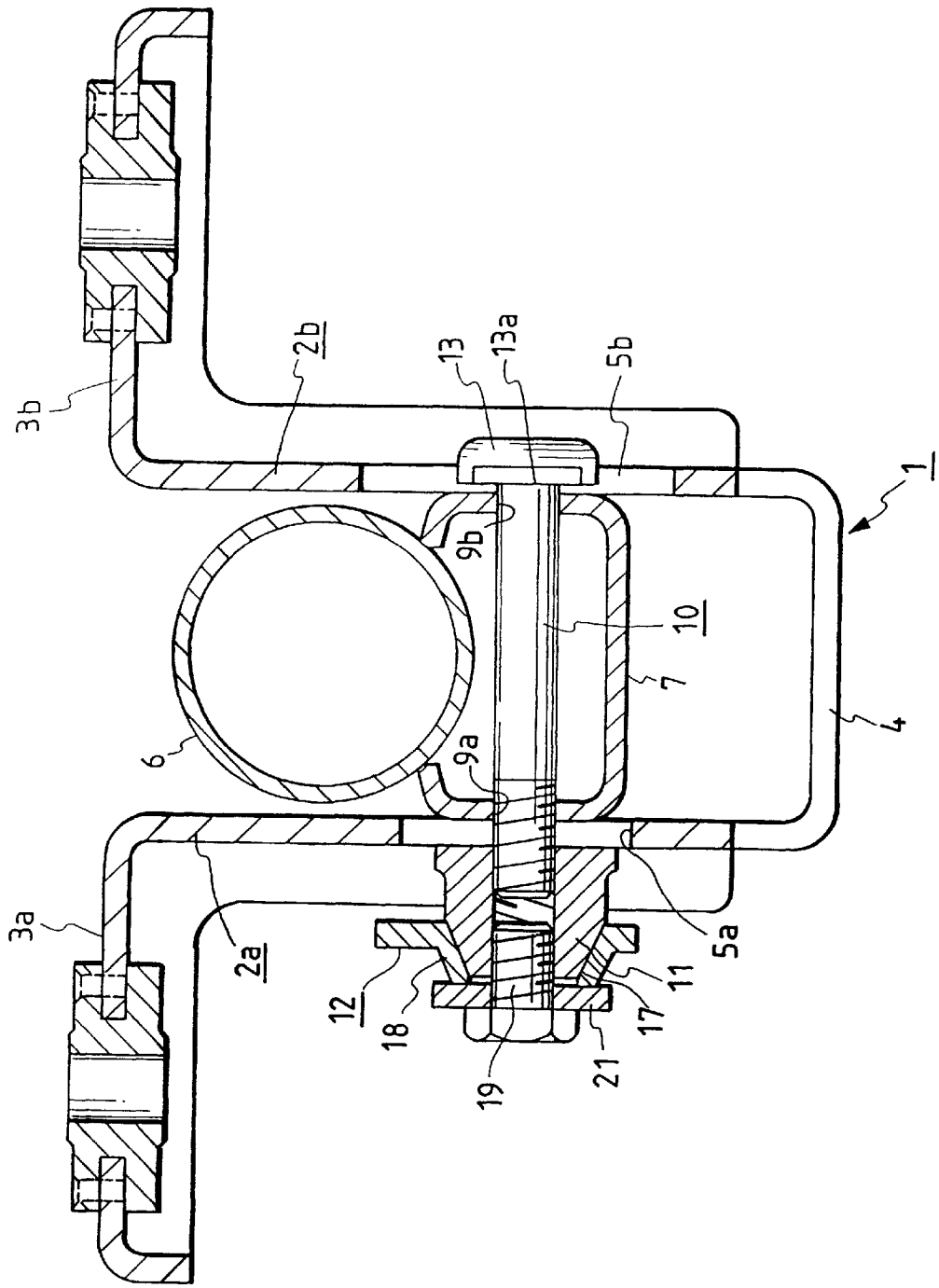
FIG. 3 is a sectional view taken along the A—A line of FIG. 2.

An operation lever 12a is made of synthetic resin by means of injection molding or of aluminum alloy by means of die-cast molding. The shape and structure of the operation lever 12a are identical to those of the one shown in FIG. 2 except for its base end portion, so only a base end portion 12b is shown in FIG. 1. The base end portion 12b of the operation lever 12a is formed with a serrated hole 20. On the other hand, a male serrated portion 21 is formed on the outer peripheral surface of the intermediate portion of an adjusting nut 11a in its axial direction (a lateral direction in FIG. 1), and engaged with the serrations of the hole 20. The adjusting nut 11a is engaged with the left end of the adjusting bolt 10. Also, an arresting flange 22 is formed on a base end portion (right end portion in FIG. 1) of the adjusting nut 11a. The outer peripheral surface of the arresting flange 22 is provided with at least a pair of flat faces in parallel with each other, whereby the nut 11a can be rotated by a tool such as a spanner at the time of assembling a tilt-type steering device. Therefore, it is preferable to shape the outer periphery of the arresting flange 22 into a hexagonal shape like a nut. When securing the steering column 6 to the supporting bracket 1, only the end portion (left end portion in FIG. 1) of the adjusting bolt 10 is engaged with the right end portion of the nut 11a with the distance between the head 13 of the bolt 10 and the nut 11a shortened.

The length L of the half portion (left half portion in FIG. 1) of the adjusting nut 11a projecting from the outer side surface (left side surface in FIG. 1) of the arresting flange 22 in the axial direction is larger than the thickness T of the base end portion 12b of the operation lever 12a (L>T). Therefore, with the male serration portion 21 of the nut 11 engaged with the serrations of the hole 20 and the inner side surface (right side surface in FIG. 1) of the base end portion 12b of the operation lever 12a brought into contact with the outer side surface of the arresting flange 22 of the nut 11, the end portion (left end portion in FIG. 1) of the adjusting nut 11a is protruded from the outer side surface of the base end portion 12b of the operation lever 12a.

A fixing screw 19a is engaged with the adjusting nut 11a from the end surface side of the adjusting nut 11. A base end portion of a leaf spring 24 constituting an elastic member, is held and fixed tightly between a head 23 of the fixing screw 19a and the end face of the nut 11a. The leaf spring 24 exerts an elastic force in a direction toward the portion of the nut 12a where the thickness of the nut 11a over its axial direction is enlarged. Accordingly, the end portion of this leaf spring 24 is elastically in contact with the outer side surface of the base end portion 12b of the operation lever 12a to elastically urge the base end portion 12b of the operation lever 12a toward the arresting flange 22.

In the above-structured steering device of the present invention, the transmission of rotational motion from the operation lever 12a to the adjusting nut 11a is performed in accordance with the engagement between the male serrated portion 21 of the adjusting nut 11a and the serrated hole 20 of the operation lever 12a. Accordingly, in order to perform sure transmission of the above rotational motion, there is no need to press a portion of the operation lever 12a against the adjusting nut 11a strongly. Therefore, it is possible to form the operation lever 12a by the use of synthetic resin, aluminum alloy, etc. having lower strength than steel.

Also, since the base end portion of the operation lever 12a is pressed by the leaf spring 24 toward the arresting flange 22 formed on the base end portion of the adjusting nut 11a, the engaged portion between the adjusting nut 11a and the operation lever 12a will not be loosened, in spite of vibration produced during running of the automobile. The pressing force of the leaf spring 24 is set to a sufficient degree so as to be capable of avoiding backlash of the engaged portion. Therefore, the operation lever 12a formed of synthetic resin or aluminum alloy is never damaged by the above-mentioned pressing force. Further, even though the difference (L−T) between the length L and the thickness T is changed due to the temperature variations, this change is absorbed by the leaf spring 24. Therefore, the engaged portion between the operation lever 12a and the adjusting nut 11a will not be loosened, and excessive stress leading to the damage of the component elements will not be applied.

What is claimed is:

1. A column mounting assembly for a tilt-type steering device, comprising:

a tilt adjusting bolt disposed raisably and lowerably between a pair of vertical plate portions of a supporting bracket to be fixed to an automobile body, and being raised and lowered together with a steering column disposed between said vertical plate portions; and a tilt adjusting nut engaged with a male screw portion formed on an end portion of said tilt adjusting bolt, a first member constituted by one of said tilt adjusting nut and a head of said tilt adjusting bolt being engaged with one of said vertical plate portions so as not to be made rotatable, a second member constituted by the other of said tilt adjusting nut and said head of said tilt adjusting bolt being made rotatable with respect to said vertical plate portions, a base end portion of an operation lever being engaged to said second member so that said tilt adjusting bolt can be fastened and unfastened with respect to said supporting bracket in accordance with rotation of said operation lever, a serrated hole being formed in said base portion of said operation lever, a serrated portion being provided on at least an intermediate portion of said second member in its axial direction, with said serrated portion engaged with said serrated hole, an inner side surface of said base end portion of said operation lever being brought into contact with an outer side surface of an arresting flange formed on a base end portion of said second member, a base end portion of an elastic member being fixed to an end portion of said second member, and an end portion of said elastic member resiliently urging an outer side surface of said base end portion of said operation lever toward said arresting flange.

2. A column mounting assembly according to claim 1, wherein said elastic member is a leaf spring.

3. A column mounting assembly for a tilt-type steering device, comprising:

a tilt adjusting bolt disposed raisably and lowerably between a pair of vertical plate portions of a supporting bracket to be fixed to an automobile body, and being raised and lowered together with a steering column disposed between said vertical plate portions; and a tilt adjusting nut engaged with a male screw portion formed on an end portion of said tilt adjusting bolt, said tilt adjusting nut being engaged with one of said vertical plate portions so as not to be made rotatable, said tilt adjusting bolt being made rotatable with respect to said vertical plate portions, a base end portion of an operation lever being engaged with said tilt adjusting bolt so that said tilt adjusting bolt can be fastened and unfastened with respect to said supporting bracket in accordance with rotation of said operation lever, a serrated hole being formed in said base end portion of said operation lever, a serrated portion being provided on an end portion of said tilt adjusting bolt, with said serrated portion engaged with said serrated hole, an inner side surface of said base end portion of said operation lever being in contact with an outer side surface of an arresting flange formed on a base end portion of said tilt adjusting bolt, a base end portion of an elastic member being fixed to an end portion of said tilt adjusting bolt, and an end portion of said elastic member resiliently urging an outer side surface of said base end portion of said operation lever toward said arresting flange.

4. A column mounting assembly according to claim 3, wherein said elastic member is a leaf spring.

* * * * *